US012288532B2

(12) United States Patent
Lee et al.

(10) Patent No.: US 12,288,532 B2
(45) Date of Patent: Apr. 29, 2025

(54) BACKLIGHT COMPENSATION METHOD, DEVICE AND SYSTEM, AND NON-TRANSITORY COMPUTER-READABLE STORAGE MEDIUM

(71) Applicant: Beijing Xianxin Technology Co., Ltd, Beijing (CN)

(72) Inventors: Kiwon Lee, Beijing (CN); Jihoon Park, Beijing (CN); Youngjin Lim, Beijing (CN); Chenghui Yan, Beijing (CN)

(73) Assignee: Beijing Xianxin Technology Co., Ltd, Beijing (CN)

( * ) Notice: Subject to any disclaimer, the term of this patent is extended or adjusted under 35 U.S.C. 154(b) by 0 days.

(21) Appl. No.: 18/423,321

(22) Filed: Jan. 26, 2024

(65) Prior Publication Data

US 2024/0161707 A1 May 16, 2024

Related U.S. Application Data

(63) Continuation of application No. PCT/CN2022/107596, filed on Jul. 25, 2022.

(30) Foreign Application Priority Data

Jul. 26, 2021 (CN) ......................... 202110846033.8

(51) Int. Cl.
*G09G 3/34* (2006.01)

(52) U.S. Cl.
CPC ... *G09G 3/3426* (2013.01); *G09G 2320/0233* (2013.01)

(58) Field of Classification Search
CPC ..................... G09G 3/3426; G09G 2320/0233
See application file for complete search history.

(56) References Cited

U.S. PATENT DOCUMENTS 8,836,735 B2 * 9/2014 Fujiwara .............. G09G 3/3611
345/88
9,324,279 B2 * 4/2016 Fujiwara .............. G09G 3/3413
(Continued)

FOREIGN PATENT DOCUMENTS

CN 101281302 10/2008
CN 101578002 11/2009
(Continued)

OTHER PUBLICATIONS

"International Search Report (Form PCT/ISA/210) of PCT/CN2022/107596," mailed on Oct. 10, 2022, with English translation thereof, pp. 1-7.

(Continued)

*Primary Examiner* — Gene W Lee
(74) *Attorney, Agent, or Firm* — JCIPRNET

(57) ABSTRACT

The present disclosure provides a backlight compensation method, device and system, and a storage medium. The method is used to compensate brightness of a plurality of mini-LEDs in a backlight unit, where the plurality of mini-LEDs include M rows and N columns, and both M and N are positive integers greater than 1, and the method includes: acquiring a control signal for controlling the brightness of the backlight unit, and acquiring a row compensation value corresponding to mini-LEDs in each row and a column compensation value corresponding to mini-LEDs in each column; compensating the mini-LEDs in each row and the mini-LEDs in each column according to the row compensation value and the column compensation value, to obtain a compensated control signal; and controlling the brightness of the backlight unit according to the compensated control signal.

16 Claims, 12 Drawing Sheets

(56) References Cited

U.S. PATENT DOCUMENTS

| | | | | |
|---|---|---|---|---|
| 10,585,286 | B2 * | 3/2020 | Kolchin | G09G 3/003 |
| 11,710,438 | B2 * | 7/2023 | Xi | G09G 3/3426 345/694 |
| 11,790,863 | B2 * | 10/2023 | Xiao | G09G 3/3406 345/87 |
| 2008/0007509 | A1 | 1/2008 | Lankhorst et al. | |
| 2011/0273488 | A1 * | 11/2011 | Fujiwara | G09G 3/3413 345/690 |
| 2019/0227383 | A1 * | 7/2019 | Wu | G02F 1/1368 |

FOREIGN PATENT DOCUMENTS

| | | |
|---|---|---|
| CN | 104715731 | 6/2015 |
| CN | 104867455 | 8/2015 |
| CN | 106328048 | 1/2017 |
| CN | 107547808 | 1/2018 |
| CN | 109036260 | 12/2018 |
| CN | 109164641 | 1/2019 |
| CN | 109283745 | 1/2019 |
| CN | 109285498 | 1/2019 |
| CN | 109727569 | 5/2019 |
| CN | 110264964 | 9/2019 |
| CN | 110634435 | 12/2019 |
| CN | 110796995 | 2/2020 |
| CN | 111681616 | 9/2020 |
| CN | 112634823 | 4/2021 |
| CN | 113129846 | 7/2021 |
| CN | 113450730 | 9/2021 |
| JP | 2008021649 | 1/2008 |
| KR | 20160052844 | 5/2016 |

OTHER PUBLICATIONS

"Written Opinion of the International Searching Authority (Form PCT/ISA/237) of PCT/CN2022/107596," mailed on Oct. 10, 2022, with English translation thereof, pp. 1-8.
"Office Action of China Counterpart Application", issued on Mar. 3, 2022, p. 1-p. 14.
"Office Action of China Counterpart Application", issued on Apr. 12, 2022, p. 1-p. 9.
"Notice of Allowance of China Counterpart Application," issued on Jun. 8, 2022, with English translation thereof, pp. 1-7.
"Office Action of Korea Counterpart Application", issued on Sep. 20, 2024, with English translation thereof, p. 1-p. 13.

* cited by examiner

BACKLIGHT COMPENSATION METHOD, DEVICE AND SYSTEM, AND NON-TRANSITORY COMPUTER-READABLE STORAGE MEDIUM

CROSS-REFERENCES TO RELATED APPLICATIONS

This application is a continuation of International Application No. PCT/CN2022/107596, filed on Jul. 25, 2022, which claims priority to Chinese Patent Application No. 202110846033.8, filed with the China National Intellectual Property Administration on Jul. 26, 2021, and entitled "BACKLIGHT COMPENSATION METHOD, DEVICE AND SYSTEM, AND STORAGE MEDIUM". The content of the above applications are hereby incorporated by reference in their entireties.

TECHNICAL FIELD

The present disclosure relates to backlight compensation technologies and, in particular, to a backlight compensation method, device and system, and a non-transitory computer-readable storage medium.

BACKGROUND

Backlight unit (BLU) is a kind of light source located behind a liquid crystal display, and its luminous effect may directly affect a visual effect of a liquid crystal display module. The backlight unit in the prior art may include a plurality of direct-type mini light emitting diodes. Since there are many mini light emitting diodes (Mini-LED) as light sources in the backlight unit, uneven brightness of the mini-LEDs may occur.

At present, the problem of uneven brightness of the mini-LEDs can be solved by inserting a film or a reflector and other changes in structure. However, this method may cause problems of long manufacturing time and high cost of the backlight unit.

SUMMARY

The present disclosure provides a backlight compensation method, device and system, and a storage medium, so as to solve the problems of long manufacturing time and high cost of a backlight unit.

In a first aspect, the present disclosure provides a backlight compensation method, to compensate for brightness of a plurality of mini-LEDs in a backlight unit, where the plurality of mini-LEDs include M rows and N columns, and both M and N are positive integers greater than 1, and the method includes:

- acquiring a control signal for controlling the brightness of the backlight unit, and acquiring a row compensation value corresponding to mini-LEDs in each row and a column compensation value corresponding to mini-LEDs in each column;
- compensating the mini-LEDs in each row and mini-LEDs in each column according to the row compensation value and the column compensation value to obtain a compensated control signal; and
- controlling the brightness of the backlight unit according to the compensated control signal.

In an implementation, the backlight unit is configured to provide a backlight function for a liquid crystal panel; the method further includes:

- determining a row compensation value corresponding to each row and a column compensation value corresponding to each column; and
- storing the row compensation value corresponding to each row and the column compensation value corresponding to each column in a look-up-table;
- correspondingly, the acquiring the control signal for controlling the brightness of the backlight unit and acquiring the row compensation value corresponding to mini-LEDs in each row and the column compensation value corresponding to mini-LEDs in each column includes:
- acquiring a control signal matching with a display picture of the liquid crystal panel; and
- looking up the row compensation value corresponding to mini-LEDs in each row and the column compensation value corresponding to mini-LEDs in each column from the look-up-table, or acquiring the row compensation value and the column compensation value inputted by the user.

In an implementation, the determining the row compensation value corresponding to each row and the column compensation value corresponding to each column includes:

- determining a first compensation value corresponding to each row according to positions of mini-LEDs in each row, where the first compensation value of a row located at an edge position is greater than the first compensation value of a row located in a middle position;
- determining a second compensation value corresponding to each row according to a distance between mini-LEDs in each row and a power supply, where the second compensation value is positively correlated with the distance;
- for each row, adding the first compensation value of the row to the second compensation value of the row to obtain the row compensation value corresponding to the row; and
- determining the column compensation value corresponding to each column according to positions of mini-LEDs in each column, where the column compensation value corresponding to a column located at an edge position is greater than the column compensation value corresponding to a column located in a middle position.

In an implementation, the determining the row compensation value corresponding to each row and the column compensation value corresponding to each column includes:

- controlling each mini-LED based on a same control signal, and testing an actual display brightness of each mini-LED through a grayscale meter or acquiring the actual display brightness of each mini-LED inputted by a user;
- selecting a mini-LED with lowest actual display brightness from a row farthest from a power supply, and calculating the row compensation value corresponding to each row according to the actual display brightness of the selected mini-LED and the actual display brightness of other mini-LEDs in a column where the selected mini-LED is located; and
- selecting a mini-LED with lowest actual display brightness from a column located at an edge position, and calculating the column compensation value corresponding to each column according to the actual display brightness of the selected mini-LED and the actual display brightness of other mini-LEDs in a row where the selected mini-LED is located.

In an implementation, the control signal includes backlight image data sent by a timing controller to a dimmer controller, and also includes a duty ratio and/or a current value sent by the dimmer controller to an LED driver;

the compensating mini-LEDs in each row and mini-LEDs in each column according to the row compensation value and the column compensation value to obtain the compensated control signal includes:

compensating, by the dimmer controller, the backlight image data corresponding to mini-LEDs in each row according to the row compensation value to obtain compensated backlight image data, and determining the duty ratio and/or the current value according to the compensated backlight image data and sending to the LED driver; and compensating, by the LED driver, the duty ratio and/or the current value of mini-LEDs in each column according to the column compensation value, so as to generate a corresponding pulse width modulation (PWM) signal according to the compensated duty ratio and/or the compensated current value to control a corresponding brightness of each mini-LED.

In an implementation, there are a plurality of LED drivers, and each LED driver is configured to drive some of the mini-LEDs in the backlight unit; and the compensating, by the LED driver, the duty ratio and/or the current value of mini-LEDs in each column according to the column compensation value includes:

acquiring, by each LED driver, rows and columns where mini-LEDs within a control range of the LED driver are located, and acquiring the row compensation values corresponding to the rows within the control range and the column compensation values corresponding to the columns within the control range; and compensating the duty ratios and/or the current values of the mini-LEDs within the control range according to the row compensation values and the column compensation values within the control range of each LED driver.

In an implementation, the method further includes:

determining an abnormality compensation value corresponding to a mini-LED with display abnormality; and compensating, by the timing controller, the backlight image data according to the abnormality compensation value to obtain compensated backlight image data, and sending the compensated backlight image data to the dimmer controller.

In a second aspect, the present disclosure provides a backlight compensation device, including: a memory and at least one processor;

the memory stores computer-executable instructions; and the at least one processor executes the computer-executable instructions stored in the memory, so that the at least one processor executes any one of methods according to the first aspect.

In a third aspect, the present disclosure further provides a backlight compensation system, including: the backlight compensation device according to the second aspect and a backlight unit.

In a fourth aspect, the present disclosure further provides a computer-readable storage medium having computer-executable instructions stored therein, where the computer-executable instructions, when executed by a processor, are used to implement any one of methods according to the first aspect.

The backlight compensation method, device and system and the storage medium provided in the present disclosure are used to compensate brightness of a plurality of mini-LEDs in a backlight unit, where the plurality of mini-LEDs include M rows and N columns, and both M and N are positive integers greater than 1. They involve: acquiring a control signal for controlling the brightness of the backlight unit, and acquiring a row compensation value corresponding to mini-LEDs in each row and a column compensation value corresponding to mini-LEDs in each column; compensating mini-LEDs in each row and mini-LEDs in each column according to the row compensation value and the column compensation value to obtain a compensated control signal; and controlling the brightness of the backlight unit according to the compensated control signal. In this way, the brightness compensation is realized without changing a structure of the backlight unit, reducing the manufacturing time and cost of the backlight unit; and the row and column are used as basic units for compensation, so that not only correction can be achieved in a wide range, but also a data storage amount and a data reading amount can be reduced, thereby improving the control efficiency and further reducing the cost.

BRIEF DESCRIPTION OF DRAWINGS

The drawings, which are incorporated in the specification and constitute a part of this specification, illustrate embodiments consistent with the present disclosure and together with the description, serve to explain the principles of the present disclosure.

Figure 1:
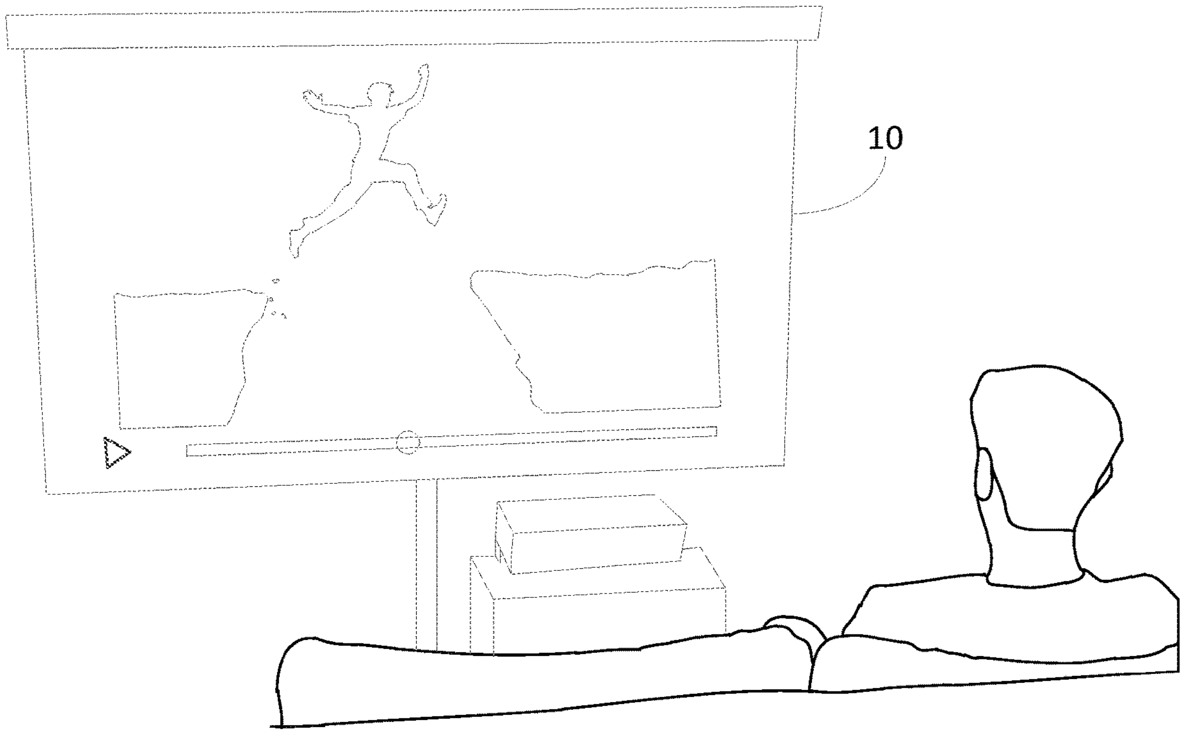
FIG. 1 is a schematic diagram of an application scenario provided in an embodiment of the present disclosure.

Through the above drawings, specific embodiments of the present disclosure have been shown, which will be described in more detail later. These drawings and written descriptions are not intended to limit the scope of the concept of the present disclosure in any way, but to explain the concept of the present disclosure to those skilled in the art with reference to certain embodiments.

DESCRIPTION OF EMBODIMENTS

Exemplary embodiments will be explained in detail herein, examples of which are shown in the drawings. When the following description refers to the drawings, unless otherwise indicated, the same numbers in different drawings indicate the same or similar elements. The implementations described in the following exemplary embodiments do not represent all implementations consistent with the present disclosure. Rather, they are merely examples of apparatus and methods consistent with some aspects of the present disclosure described in detail in the appended claims.

The terms used in the embodiments of the present disclosure are for the purpose of describing specific embodiments only, and are not intended to limit the present disclosure. The singular forms “a” and “the” used in the embodiments of the present disclosure are also intended to include the plural forms, unless the context clearly indicates other meanings.

Depending on the context, the word “if” as used herein may be interpreted as “when” or “in response to the determination that” or “in response to the detection that”. Similarly, depending on the context, the phrases “if it is determined” or “if it (stated condition or event) is detected” may be interpreted as “when it is determined” or “in response to the determination that” or “when it is detected that (a stated condition or event)” or “in response to the detection that (stated condition or event)”.

It should also be noted that the terms “including”, “comprising” or any other variations thereof are intended to cover non-exclusive inclusion, so that an article or system including a series of elements includes not only these elements, but also other elements not explicitly listed, or elements inherent to such article or system. Without further limitations, an element defined by the phrase “including a” does not exclude the existence of other identical element in the article or system that includes the element.

An application scenario provided in an embodiment of the present disclosure is explained as follows.

The solution provided in embodiments of the present disclosure relates to a backlight unit. The backlight unit may also be called a backlight module. The liquid crystal display (LCD) of a display device itself cannot emit light, and thus the liquid crystal display needs a backlight unit as light source.

In some technologies, a cold cathode fluorescent lamp (CCFL) is selected as a light source of the backlight unit. Although the cold cathode fluorescent lamp has high luminous efficiency, it does not have local dimming ability, consumes a lot of voltage, and has a certain limitation in reducing volume and weight, and in improving luminous efficiency, it needs mercury substance and thus has high cost.

In some other technologies, a LED light bar is selected as the light source of the backlight unit. The LED light bar has low power consumption, bright and high brightness, excellent readability and bright color. However, it still does not have the local dimming ability, and when converting a line light source into a plane light source, it needs many optical elements such as a reflector, a diffuser, a prism sheet (horizontal, vertical), a protective film and the like made of polymer materials difficult to reuse, which causes a high cost.

Therefore, the embodiments of the present disclosure select as the light source of the backlight unit a mini-LED, which may be used to locally adjust the brightness of the backlight unit and has a low cost.

FIG. 1 is a schematic diagram of an application scenario provided in an embodiment of the present disclosure. As shown in FIG. 1, when a user is watching a TV program, a liquid crystal panel 10 emits light through a backlight unit behind a screen, so that the user may see picture information on the liquid crystal panel 10.

When the mini-LED is selected as the light source of the backlight unit, more mini-LEDs are needed as the light source. Moreover, the mini-LED may have a brightness deviation due to various reasons, resulting in uneven brightness of the backlight unit.

The inventive concept of the embodiments of the present disclosure will be explained in the following.

Figure 2A:
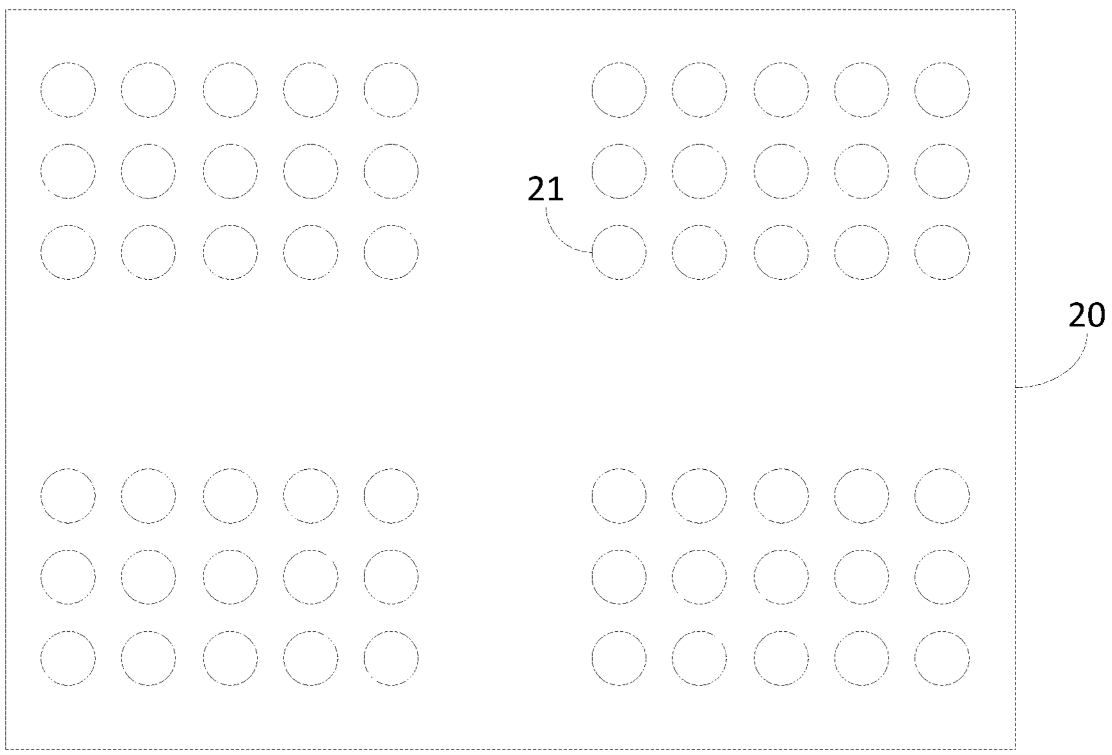
FIG. 2A is a schematic structural diagram of mini-LEDs in a backlight unit provided in an embodiment of the present disclosure.
Figure 2B:
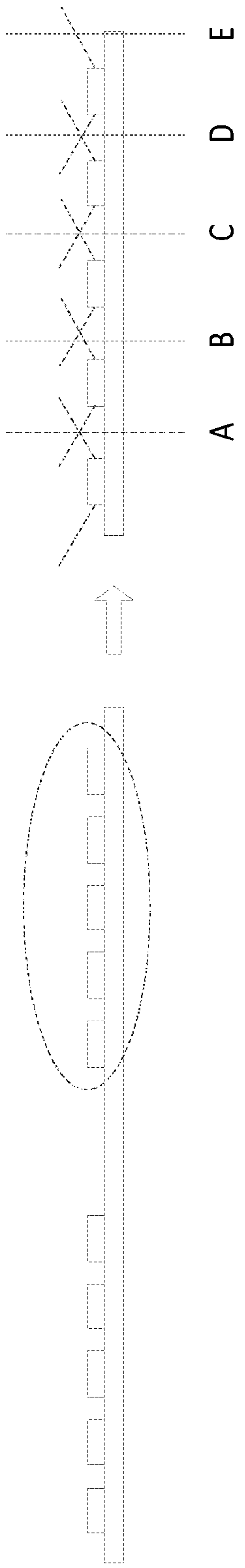
FIG. 2B is a schematic diagram of a principle of uneven brightness of the backlight unit shown in FIG. 2A.

FIG. 2A is a schematic structural diagram of a mini-LED in a backlight unit provided in an embodiment of the present disclosure. As shown in FIG. 2A, a plurality of the mini-LEDs 21 are evenly distributed in the backlight unit 20, and positions of the mini-LEDs 21 in the backlight unit may be at least divided as an edge position and a middle position. FIG. 2B is a schematic diagram of a principle of uneven brightness of the backlight unit shown in FIG. 2A. As shown in FIG. 2B, when viewed from a side of the backlight unit, it may be acquired that the brightness displayed at the middle positions A, B, C and D with mini-LEDs on both sides of the middle positions is generated by the superposition of the brightness of two mini-LEDs, and the brightness displayed in a position E with a mini-LED on only one side of the position is the brightness of one mini-LED, so the brightness at the positions A, B, C and D is different from the brightness at the position E, and the brightness at the positions A, B, C and D is larger than the brightness at the position E, which is a situation of uneven brightness of backlight unit that is caused by the structure of the backlight unit.

Figure 3A:
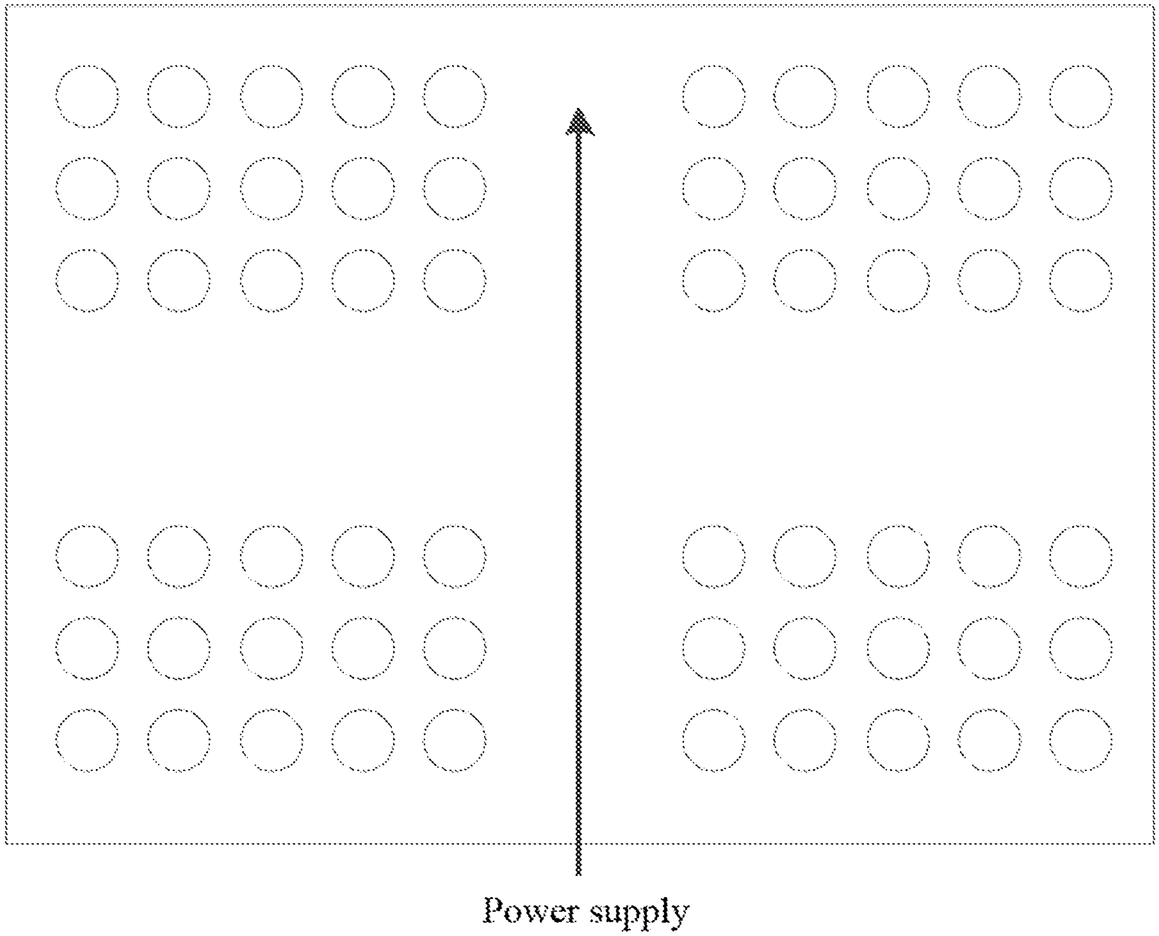
FIG. 3A is a schematic diagram of a positional relationship between a power supply and a mini-LED in a backlight unit provided in an embodiment of the present disclosure.
Figure 3B:
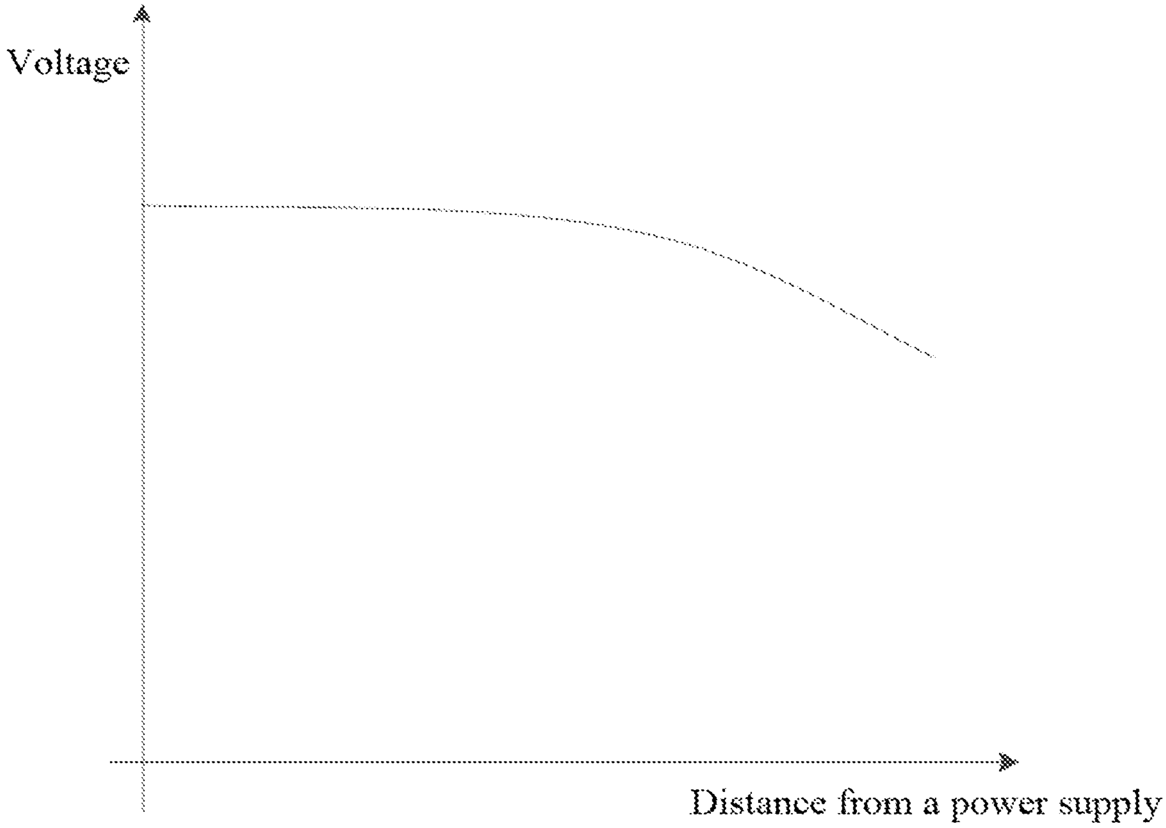
FIG. 3B is a graph showing a relationship between a voltage of a mini-LED in a backlight unit and a distance of the mini-LED from a power supply provided in an embodiment of the present disclosure.

In addition, a position of a power supply may also be a cause of uneven brightness. FIG. 3A is a schematic diagram of a positional relationship between a power supply and a mini-LED in a backlight unit provided in an embodiment of the present disclosure. As shown in FIG. 3A, the power supply is disposed at one end of the backlight unit, and distances between mini-LEDs in each row and the power supply are different. FIG. 3B is a graph showing a relationship between a voltages of a mini-LED and a distance of the mini-LED from a power supply in a backlight unit provided in an embodiment of the present disclosure. As shown in FIG. 3B, when the mini-LED is farther away from the power supply, the voltage tends to decrease, resulting in the brightness of the mini-LED which is farther away from the power supply in FIG. 3A is darker, which is a situation of uneven brightness caused by the decreased voltage.

In some technologies, for the problem of uneven light emission of the mini-LEDs caused by the above possible situations, it may be solved by changing the structural through inserting a film or reflector, or by replacing some mini-LEDs with quality problems. However, these solutions may cause the problems of long manufacturing time and high cost of the backlight unit.

In some other technologies, the problem of uneven brightness may be solved by adding a compensation signal. Specifically, a corresponding compensation value may be set for each mini-LED, but this may lead to the need for storing and reading too much data and affect the performance of the backlight unit. During practical application, inventors of the embodiments of the present disclosure analyzed and found the reason of uneven brightness of the backlight unit, and based on this, designed a solution of compensating brightness based on rows and columns. Specifically, compensation values may be set for LEDs in each row and mini-LEDs in each column in the backlight unit, and when acquiring a control signal for controlling the brightness of the backlight unit, the corresponding mini-LEDs may be compensated according to the set row compensation values and column compensation values, and the brightness of the backlight unit may be controlled based on the compensated control signal. In this way, on the one hand, the manufacturing time and cost of the backlight unit may be reduced, and on the other hand, the data processing time may be reduced, and the control efficiency of the backlight unit may be improved.

Table 1 is a comparison table of compensation values set based on rows and columns and compensation values set based on a single mini-LED.

TABLE 1

Comparison Table of Compensation Values

| Aspect ratio | Total number of mini-LED | Number of column | Number of row | Bits of compensation value | Overall size of compensation values: For single-mini-LED-based compensation solution | Overall size of compensation values: For row/column-based compensation solution | Comparison of compensation value (%) |
|---|---|---|---|---|---|---|---|
| 16:9 | 1296 | 48 | 27 | 16 | 20736 | 1200 | 5.79 |
| | 2304 | 64 | 36 | | 36864 | 1600 | 4.34 |
| | 3600 | 80 | 45 | | 57600 | 2000 | 3.47 |
| | 5184 | 96 | 54 | | 82944 | 2400 | 2.89 |
| | 9216 | 128 | 72 | | 147456 | 3200 | 2.17 |

As may be seen from Table 1, for a device with an aspect ratio of 16:9, the number of row, the number of column and the total number of mini-LED in the backlight unit can be realized in a variety of ways, where the total number is equal to the number of row multiplied by the number of column. The compensation value of each mini-LED may occupy 16 bits. For the existing single-mini-LED-based compensation solution, since the compensation value of each mini-LED needs to be stored, the overall size of compensation value is the total number multiplied by 16. For the row/column-based compensation solution provided in the present disclosure, the overall size of compensation value is a sum of the number of row and the number of column multiplied by 16. The comparison of compensation value in the last column in the table is a ratio of the overall size of compensation value corresponding to a single-mini-LED-based compensation solution to the overall size of compensation value corresponding to the row/column-based compensation solution.

Taking data in a first row as an example, when the number of row of mini-LEDs is 27 and the number of column thereof is 48, the total number of mini-LEDs is 1296. If the compensation is made in mini-LED as a unit, the overall size of compensation value is 48*27*16=20736 bits, and if the compensation is made in row/column as a unit, the overall size of compensation value is 48*16+27*16=1200 bits, and the comparison of compensation value is 1200/20736=5.79%.

From Table 1, it may be seen that the overall size of compensation value required for the row/column-based compensation solution is significantly better than that for the single-mini-LED-based compensation solution, and the more the number of the mini-LEDs, the more obvious the advantages, which can effectively reduce data storage and reading amounts, improve the control efficiency and save costs in an actual backlight control process.

Some embodiments of the present disclosure will be described in detail with reference to the drawings below. Under the condition that there is no conflict between the embodiments, the following embodiments and features in the embodiments may be combined with each other.

Figure 4:
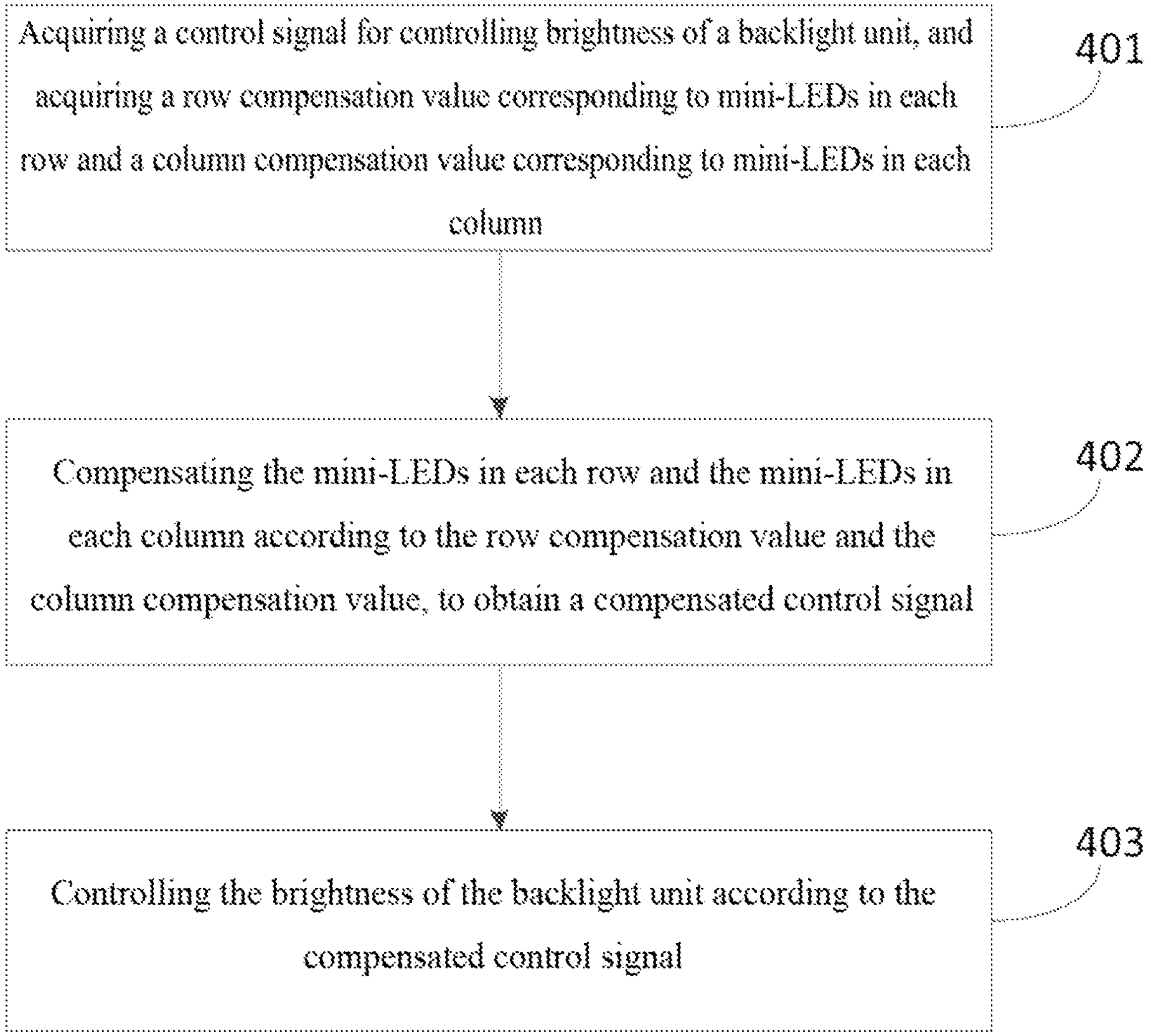
FIG. 4 is a flowchart of a backlight compensation method provided in an embodiment of the present disclosure.

FIG. 4 is a flowchart of a backlight compensation method provided in an embodiment of the present disclosure. As shown in FIG. 4, the method is used for brightness compensation of a plurality of the mini-LEDs in a backlight unit, where the mini-LEDs include M rows and N columns, and both M and N are positive integers greater than 1, that is, the plurality of mini-LEDs are distributed in multiple rows and multiple columns. The method includes Steps 401 to 403 below:

Step 401: acquiring a control signal for controlling a brightness of a backlight unit, and acquiring a row compensation value corresponding to mini-LEDs in each row and a column compensation value corresponding to mini-LEDs in each column.

The control signal may be a signal for directly or indirectly controlling the backlight unit.

In an implementation, elements that cause the mini-LED to emit light include current and/or data, where the data may be backlight image data or PWM data. Both current and data are quantized values, so they may be calculated by using the compensation value so as to reduce the brightness difference of the mini-LEDs. Accordingly, the compensation value is used to compensate a current value or backlight image data or PWM data. And the compensation value may be a compensation value set based on lines in horizontal and vertical directions.

Figure 5:
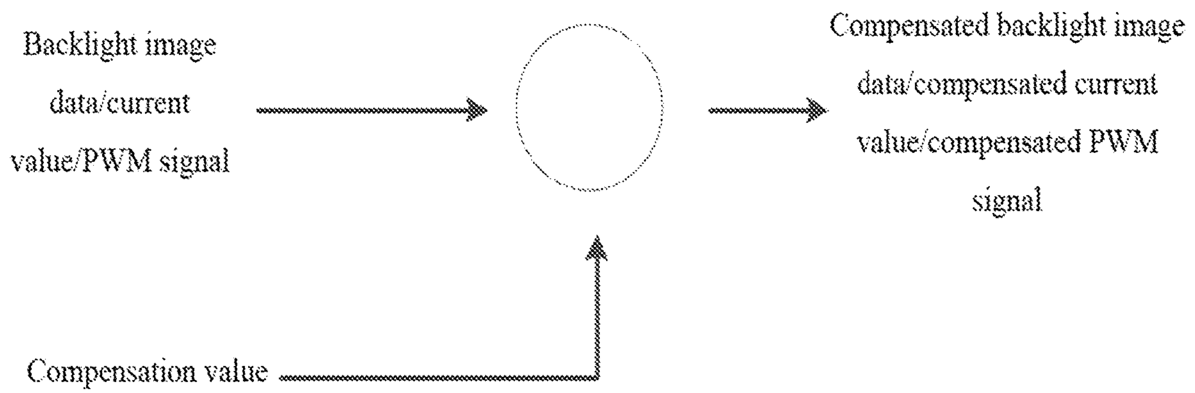
FIG. 5 is a schematic diagram of a principle of backlight compensation provided in an embodiment of the present disclosure.

FIG. 5 is a schematic diagram of a principle of backlight compensation provided in the embodiment of the present disclosure. As shown in FIG. 5, the compensation value may be added for backlight image data, a current value or a PWM signal to obtain a compensated backlight image data, a compensated current value or a compensated PWM signal, and the mini-LEDs may be controlled according to the compensated backlight image data, the compensated current value or the compensated PWM signal.

For each mini-LED, a compensation value corresponding to a row where the mini-LED is located is recorded as a row compensation value, and a compensation value corresponding to a column where the mini-LED is located is recorded as a column compensation value. In an implementation, the row compensation value corresponding to each mini-LED in each row is the same, and the column compensation value corresponding to each mini-LED in each column is the same.

Step 402: compensating the mini-LEDs in each row and the mini-LEDs in each column according to the row compensation value and the column compensation value, to obtain a compensated control signal.

In an implementation, the control signal may include a control signal corresponding to mini-LEDs in each row or mini-LEDs in each column in the backlight unit. When compensating the mini-LEDs in each row and the mini-LEDs in each column, mini-LEDs in each row may be compensated first to obtain a compensated control signal, and then mini-LEDs in each column may be compensated to obtain a compensated control signal.

In an implementation, the column may be compensated first, and then the row may be compensated to obtain the compensated control signal, and a specific compensation order is not specifically limited in this embodiment.

Step 403: controlling the brightness of the backlight unit according to the compensated control signal.

In an implementation, the compensated control signal may control the mini-LEDs in each row and the mini-LEDs in each column to emit light with a corresponding brightness, thereby controlling the brightness of the backlight unit.

In an implementation, one or more backlight units may be disposed in a display device, and the above method may be executed separately for each backlight unit.

The backlight compensation method provided in this embodiment is used for brightness compensation of a plurality of the mini-LEDs in a backlight unit, where the mini-LEDs include M rows and N columns, and both M and N are positive integers greater than 1, and the method includes: acquiring a control signal for controlling the brightness of the backlight unit, and acquiring a row compensation value corresponding to mini-LEDs in each row and a column compensation value corresponding to mini-LEDs in each column; compensating the mini-LEDs in each row and the mini-LEDs in each column to acquire a compensated control signal according to the row compensation value and the column compensation value; and controlling the brightness of the backlight unit according to the compensated control signal. In this way, the brightness compensation is realized without changing the structure of the backlight unit, reducing the manufacturing time and cost of the backlight unit; and the row and the column are used as basic units for compensation, so that not only correction can be achieved in a wide range, but also the data storage amount and data reading amount can be reduced, improving the control efficiency and further reducing the cost.

On the basis of the technical solution provided in the above embodiment, in an implementation, the backlight unit is used for providing backlight function for a liquid crystal panel; and the method further includes: determining a row compensation value corresponding to each row and a column compensation value corresponding to each column; storing the row compensation value corresponding to each row and the column compensation value corresponding to each column in a look-up-table.

In an implementation, the backlight unit composed of mini-LEDs may provide backlight for the liquid crystal panel to display a picture. The row compensation value corresponding to each row and the column compensation value corresponding to each column are determined, and stored in the look-up-table (LUT) for convenience of searching.

Figure 6:
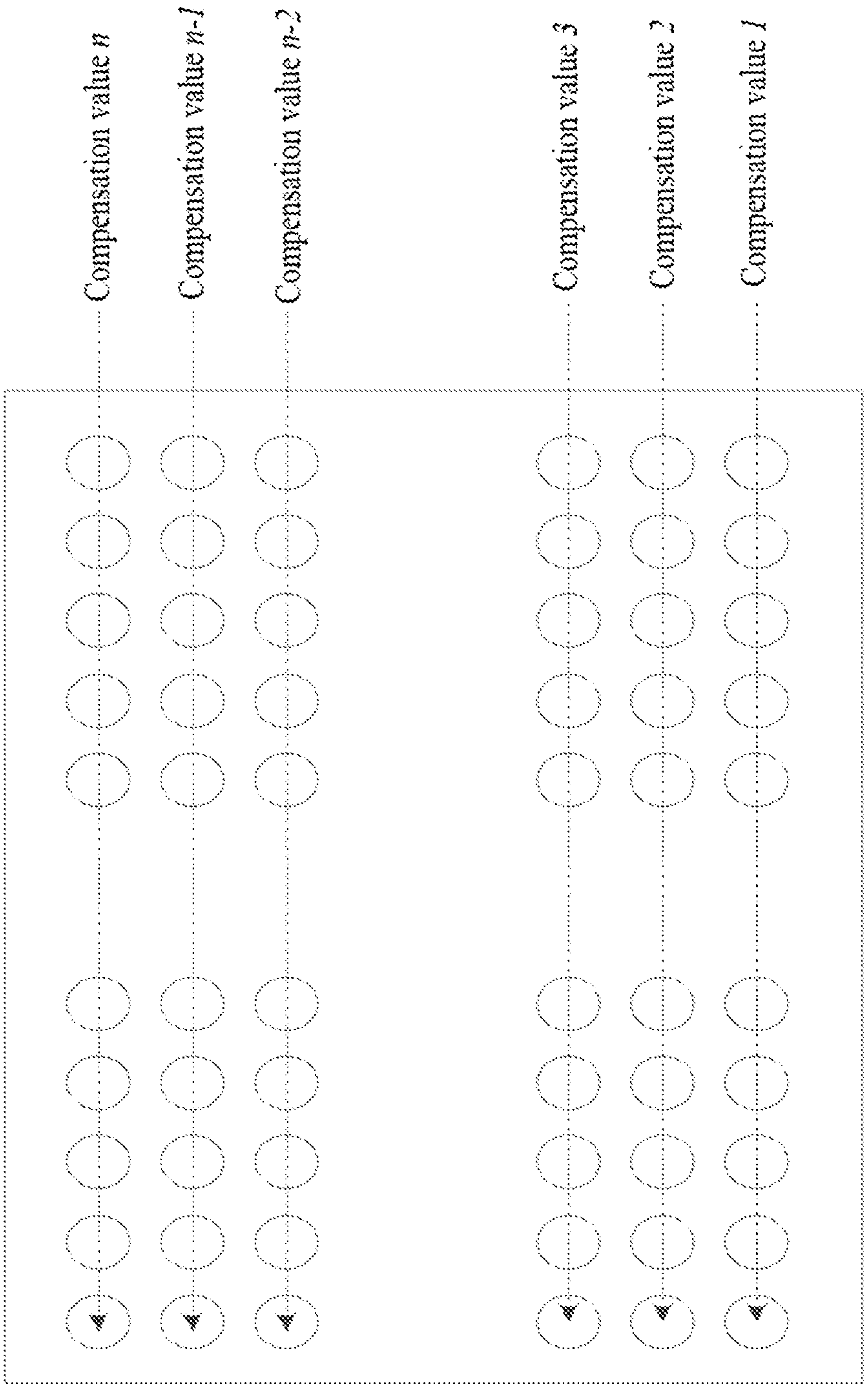
FIG. 6 is a schematic diagram of setting a compensation value based on a line in a horizontal direction provided in an embodiment of the present disclosure.

FIG. 6 is a schematic diagram of setting a compensation value based on a line in a horizontal direction provided in an embodiment of the present disclosure. As shown in FIG. 6, compensation value 1 to compensation value n are compensation values corresponding to the first row to the nth row, and mini-LEDs in the same row use the same compensation value for calculation. Some of the compensation value 1 to the compensation value n may be the same.

Specifically, when a compensation value in the second row is set to 8, a compensation value of 8 is applied to each mini-LED in the second row.

Figure 7:
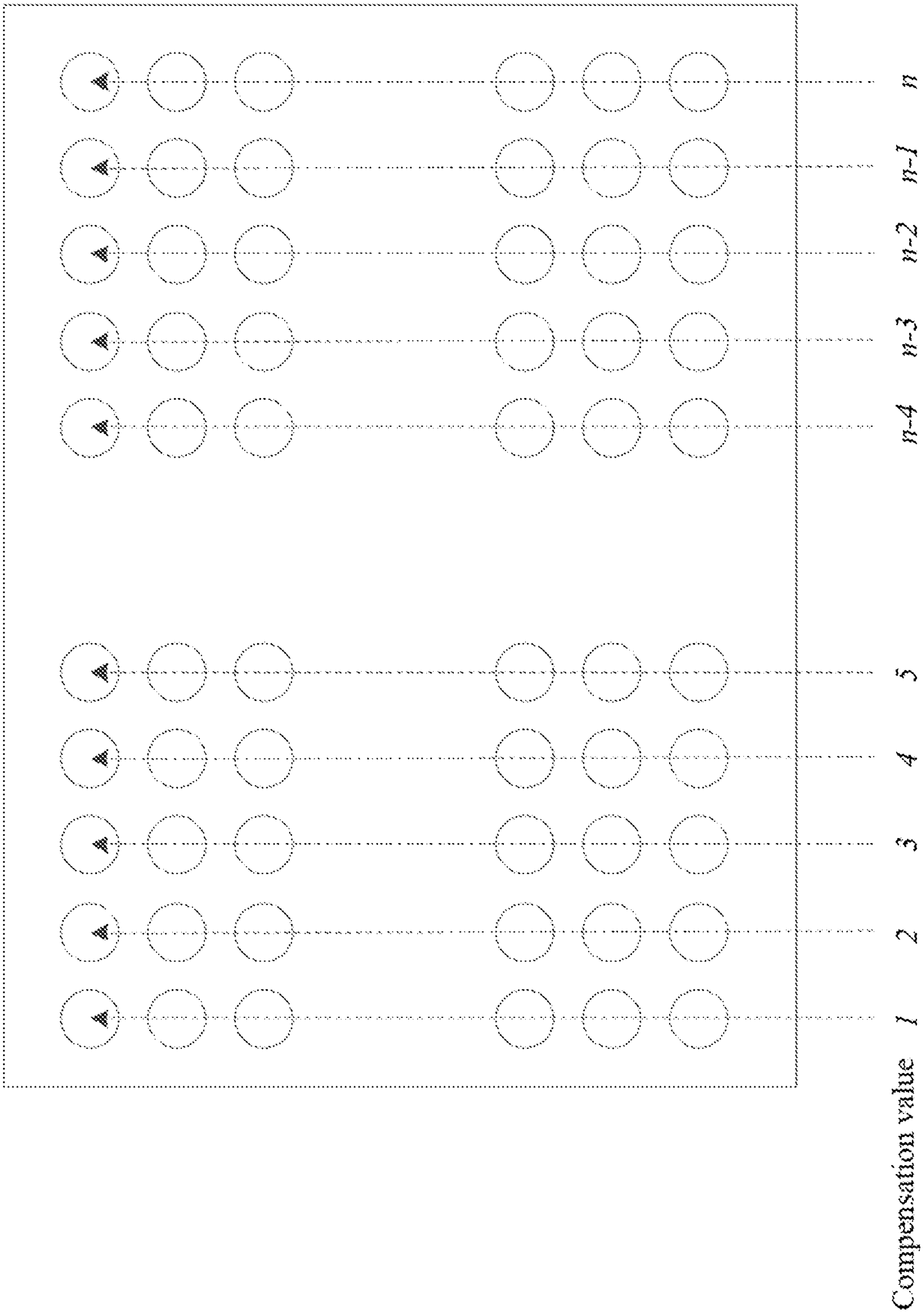
FIG. 7 is a schematic diagram of setting a compensation value based on a line in a vertical direction provided in an embodiment of the present disclosure.

FIG. 7 is a schematic diagram for setting a compensation value based on a line in a vertical direction provided in an embodiment of the present disclosure. As shown in FIG. 7, compensation value 1 to compensation value n are compensation values corresponding to the first column to the nth column, and mini-LEDs in the same column use the same compensation value for calculation. Some of the compensation value 1 to the compensation value n may be the same.

Specifically, when a compensation value in the third column is set to 7, a compensation value of 7 is applied to each mini-LED in the third column.

In an implementation, compensation may be made for the rows first, and then for the columns, or compensation may be made for the columns first, and then for the rows, and the compensation order is not specifically limited.

Figure 8:
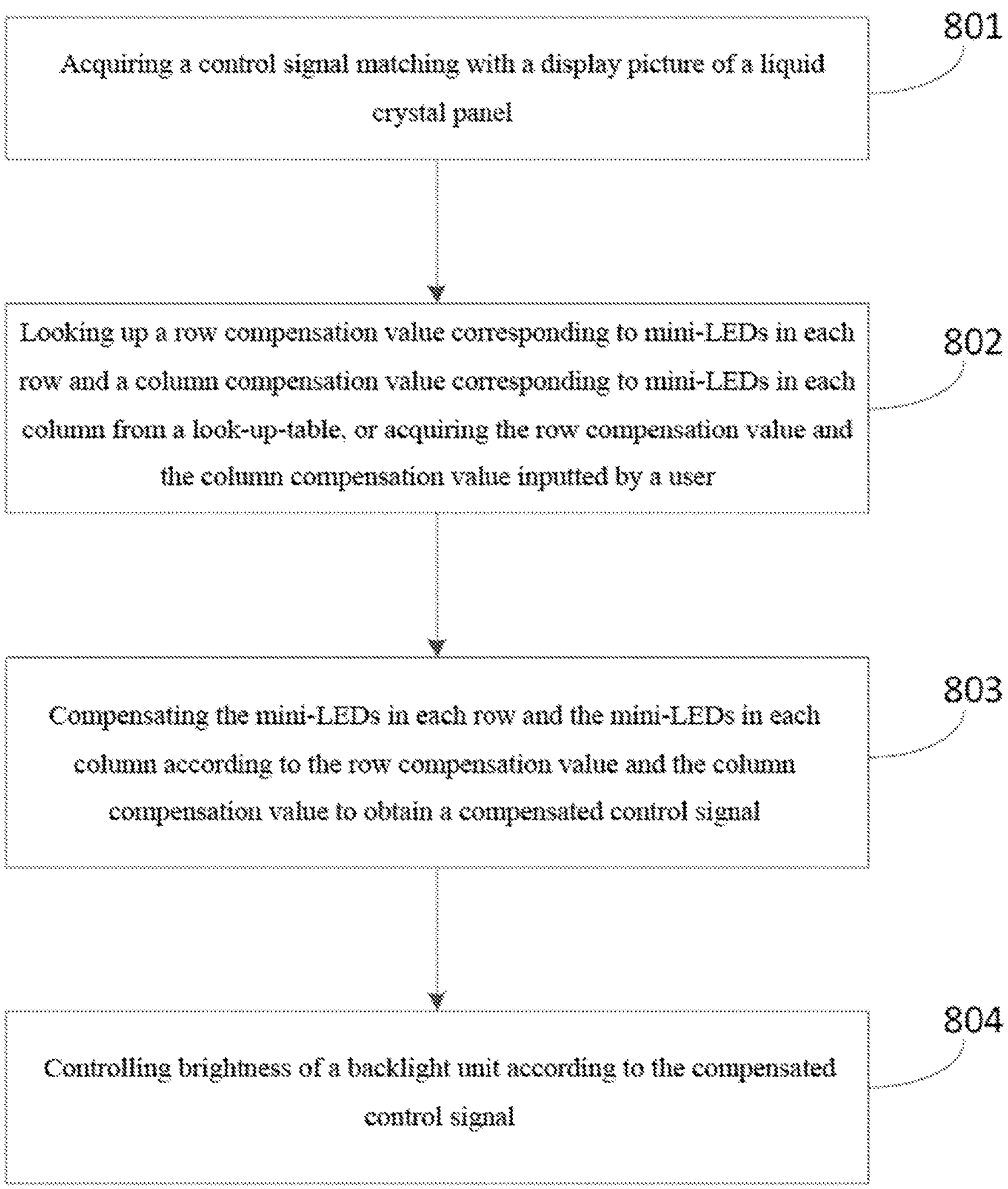
FIG. 8 is a flowchart of another backlight compensation method provided in an embodiment of the present disclosure.

FIG. 8 is a flowchart of another backlight compensation method provided in an embodiment of the present disclosure. As shown in FIG. 8, the method in this embodiment may include Steps 801 to 804 below:

Step 801: acquiring a control signal matching with a display picture of a liquid crystal panel.

In an implementation, the control signal may be used to control the brightness of mini-LEDs in each row and mini-LEDs in each column in the backlight unit, so that the brightness of the backlight unit may match with the display picture of the liquid crystal panel.

Specifically, when the display picture of the liquid crystal panel is a relative dark scene, the control signal is used to lower the brightness of the mini-LEDs in the backlight unit so as to match with the display picture of the liquid crystal panel.

Step 802: looking up a row compensation value corresponding to the mini-LEDs in each row and a column compensation value corresponding to the mini-LEDs in each column from a look-up-table, or acquiring a row compensation value and a column compensation value inputted by the user.

In an implementation, the compensation value of each row and the compensation value of each column may be determined according to the look-up-table, or may be inputted by the user.

Before the device is out of factory or in testing, the mini-LEDs in the backlight unit are debugged by inputting the row compensation value and the column compensation value via the staff. Or, when installing in the user's home, the mini-LEDs in the backlight unit are debugged by inputting the row compensation values and the column compensation values via the installer on site, so as to acquire appropriate row and column compensation values.

In an implementation, the user may also make real-time adjustments according to actual needs. For example, the mini-LEDs in the backlight unit may have aging problems, and the user may input corresponding row compensation values and column compensation values for adjustment.

In this embodiment, through Step 801 to Step 802, the control signal for controlling the brightness of the backlight unit may be acquired, and the row compensation value corresponding to mini-LEDs in each row and the column compensation value corresponding to mini-LEDs in each column may be acquired.

Step 803: compensating the mini-LEDs in each row and the mini-LEDs in each column according to the row compensation value and the column compensation value to obtain a compensated control signal.

Step 804: controlling the brightness of the backlight unit according to the compensated control signal.

The specific implementation principles of Step 803 to Step 804 in this embodiment may refer to Step 402 and Step 403 in the aforementioned embodiments, and will not be repeated here.

The control signal matching with the display picture of the liquid crystal panel is acquired, and then the corresponding compensation value is looked up from the look-up-table, which is more convenient in looking up, the look-up table stores less data, occupies small storage space, and is fast to read, and the compensation value is inputted by the user, which can help the user to perform configuration more flexibly and improve the user's experience.

In an implementation, the determining the row compensation value corresponding to each row and the column compensation value corresponding to each column includes:

determining a first compensation value corresponding to each row according to positions of mini-LEDs in each row, where the first compensation value of a row located at an edge position is greater than the first compensation value of a row located in a middle position; determining a second compensation value corresponding to each row according to distances between mini-LEDs in each row and the power supply, where the second compensation value is positively correlated with the distances; for each row, adding the first compensation value to the second compensation value of the row to obtain the row compensation value corresponding to the row; and determining the column compensation value corresponding to each column according to positions of mini-LEDs in each column. The column compensation value corresponding to a column located at edge position is greater than the column compensation value corresponding to a column located in middle position.

The first compensation value corresponding to each row may be determined according to the positions of mini-LEDs in each row. When a row is located in a middle position, it has a smaller first compensation value; when the row is at an uppermost or lowermost edge position of the backlight unit, it has a larger the first compensation value; and when it is located at a position from a middle position of the backlight unit to an upper or lower edge position of the backlight unit, it has a first compensation value that tends to become larger.

Specifically, when there are five rows of mini-LEDs in the backlight unit, which are first row to fifth row from bottom to top respectively, the first compensation value of the third row located in the middle position is smaller, and the first compensation values of the first and fifth rows are larger.

A position of the power supply in the backlight unit may be as shown in FIG. 3A. Mini-LEDs in a row far away from the power supply need a larger second compensation value, while mini-LEDs in a row close to the power supply need a smaller second compensation value, so the second compensation value is positively correlated with a distance of the mini-LED from the power supply. For example, mini-LEDs in a row farthest from the power supply need a second compensation value of 8, and mini-LEDs in a row closest to the power supply need a second compensation value of 2.

The row compensation value corresponding to each row may be acquired by adding the first compensation value to the second compensation value. For example, when the first compensation value of the first row is 5 and the second compensation value thereof is 2, the row compensation value of the first row is 7.

The column compensation value corresponding to each column may be determined according to positions of mini-LEDs in each column. When a column is located in a middle position, it has a smaller first compensation value; when the column is in a leftmost or rightmost edge position of the backlight unit, it has a larger column compensation value; and when it is located at a position from a middle position of the backlight unit to a left or right edge position of the backlight unit, it has a column compensation value that tends to become larger.

Specifically, when there are 7 columns of mini-LEDs in the backlight unit, which are first column to seventh column from left to right, respectively, the column compensation value of the fourth row located in middle position is smaller, and the column compensation values of the first and seventh columns are larger.

A corresponding relationship between the two factors, i.e., position and distance, and the compensation value may be obtained through big data analysis and processing, and may also be calculated using information such as positions, structures and circuit characteristics of the mini-LEDs.

In this embodiment, the calculation is directly according to the position of the mini-LEDs in the backlight unit and the distance of the mini-LEDs from the power supply, without need for testing each mini-LED, which can improve the efficiency of determining the row compensation value or the column compensation value.

In another implementation, the determining the row compensation value corresponding to each row and the column compensation value corresponding to each column includes: controlling each mini-LED based on the same control signal, and testing an actual display brightness of each mini-LED through a grayscale meter or acquiring an actual display brightness of each mini-LED inputted by the user; selecting a mini-LED with lowest actual display brightness from a row farthest from the power supply, and calculating the row compensation value corresponding to each row according to the actual display brightness of the selected mini-LED and the actual display brightness of other mini-LEDs in a column where the selected mini-LED is located; selecting a mini-LED with lowest actual display brightness from a column located at an edge position, and calculating the column compensation value corresponding to each column according to the actual display brightness of the selected mini-LED and the actual display brightness of other mini-LEDs in a row where the selected mini-LED is located.

The same control signal is given to each mini-LED, and the actual display brightness of each mini-LED is tested through the grayscale meter, or measured through the human eye's sensibility. In an implementation, a row farthest from the power supply may be selected, and a mini-LED with the lowest actual display brightness may be selected from this row; and based on the column where the mini-LED is located, a difference of the actual display brightness of other mini-LEDs in this column and the actual display brightness of the selected mini-LED is calculated, to obtain the row compensation value corresponding to each row.

For example, there are five rows and four columns of mini-LEDs in the backlight unit, and it is detected that a mini-LED in the first column in the fifth row, which is furthest away from the power supply, has the lowest actual display brightness, and according to the actual display brightness of the mini-LEDs in the first column, a difference between the actual display brightness of the other four mini-LEDs in the first column and the actual display brightness of the mini-LED in the first column in the fifth row is calculated, to obtain the compensation value corresponding to each row.

In an implementation, the same control signal is given to each mini-LED, and the actual display brightness of each mini-LED is tested through the grayscale meter, or measured through the human eye's sensibility. Mini-LEDs in a column located at a leftmost or rightmost edge position of the backlight unit may be selected, and a mini-LED with the lowest actual display brightness may be selected from this column; and based on a row where this mini-LED is located, a difference of the actual display brightness of other mini-LEDs in this row and the actual display brightness of the selected mini-LED is calculated, to obtain the row compensation value corresponding to each row.

Specifically, there are five rows and four columns of mini-LEDs in the backlight unit, and it is detected that a mini-LED in the fifth row in the first column, which is furthest away from the power supply, has a lowest actual display brightness, and according to the actual display brightness of the mini-LEDs in the fifth row, a difference between the actual display brightness of the other three mini-LEDs in the fifth row and the actual display brightness of the selected mini-LED in the fifth row in the first column is calculated, to obtain the compensation value corresponding to each column.

In this embodiment, a darkest mini-LED is selected, and the compensated brightness of other mini-LEDs is the same as the darkest mini-LED, and thus the compensation value may be calculated accurately and quickly.

In another implementation, a mini-LED with a lowest actual brightness may be selected from all mini-LEDs in the backlight unit, and a row and a column where this mini-LED is located may be determined, and then the column compensation value or the row compensation value of the mini-LEDs in the backlight unit may be determined based on the determined row or column. The mini-LED with the lowest actual brightness may be looked up from the backlight unit only once, and then the row compensation value and the column compensation value in the backlight unit may be quickly acquired, to correct unevenness brightness in the backlight unit.

Figure 9:
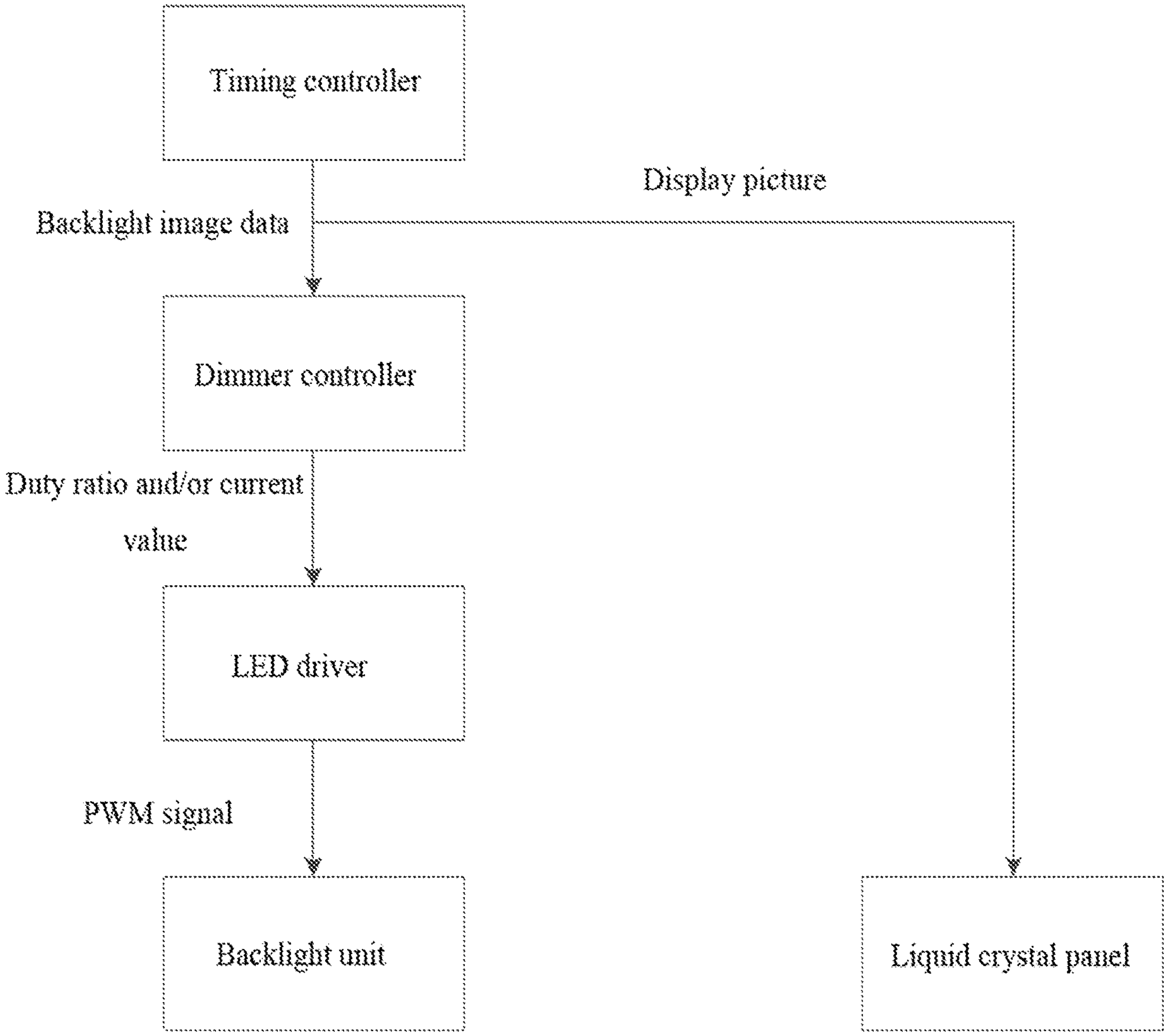
FIG. 9 is a schematic diagram of a backlight compensation system provided in an embodiment of the present disclosure.

FIG. 9 is a schematic diagram of a backlight compensation system provided in an embodiment of the present disclosure. The methods provided in the embodiments of the present disclosure may be applied to the backlight compensation system. As shown in FIG. 9, the backlight compensation system may include a timing controller, a dimmer controller, and an LED driver.

In an implementation, the timing controller is used to send the backlight image data to the dimmer controller, and the dimmer controller may determine a duty ratio and/or a current value according to backlight image data and send the duty ratio and/or the current value to the LED driver. Different backlight image data corresponds to different duty ratios and/or different current values, so that the mini-LED may display brightness corresponding to the duty ratio and/or the current value. Generally, the greater the duty ratio and/or the current value, the brighter the mini-LED. In an implementation, the control signal includes the backlight image data sent by the timing controller to the dimmer controller, and also includes the duty ratio and/or the current value sent by the dimmer controller to the LED driver.

An entity for executing the methods provided in the embodiments of the present disclosure may be at least one of the timing controller, the dimmer controller and the LED driver.

The compensating mini-LEDs in each row and mini-LEDs in each column according to the row compensation value and the column compensation value to obtain the compensated control signal includes:

compensating, by the dimmer controller, the backlight image data corresponding to mini-LEDs in each row according to the row compensation value to obtain a compensated backlight image data, and determining a duty ratio and/or a current value according to the compensated backlight image data and sending the duty ratio and/or the current value to the LED driver; compensating, by the LED driver, the duty ratio and/or the current value of mini-LEDs in each column according to the column compensation value, so as to generate a corresponding PWM signal according to a compensated duty ratio and/or a compensated current value to control the corresponding brightness of each mini-LED.

Specifically, the dimmer controller receives the backlight image data sent by the timing controller, and compensates the backlight image data corresponding to mini-LEDs in each row according to the row compensation value to obtain the compensated backlight image data. And the duty ratio and/or the current value is determined according to the compensated backlight image data and sent to the LED driver.

The LED driver receives the duty ratio and/or the current value sent by the dimmer controller, compensates the duty ratio and/or the current value of mini-LEDs in each column according to the column compensation value, and generates a corresponding PWM signal according to the compensated duty ratio and/or the compensated current value to control the brightness of each mini-LED.

In this embodiment, the dimmer controller compensates mini-LEDs in each row and the LED driver compensates mini-LEDs in each column, which can balance the burden of each device and improve the overall performance of the system.

In an implementation, the mini-LEDs in in each row and the mini-LEDs in each column may be compensated by one device of the timing controller, the dimmer controller and the LED driver, which is not specifically limited in this embodiment. For example, the dimmer controller may be selected to perform row compensation and column compensation on the backlight image data, to obtain the compensated backlight image data for generating a corresponding current value and/or a corresponding duty ratio to be sent to the LED driver, and then the LED driver does not need to perform a compensation operation. Or, the dimmer controller may first generate a corresponding current value and/or a corresponding duty ratio according to the backlight image data, and then perform row compensation and column compensation on the current value and/or the duty ratio to obtain the compensated current value or duty ratio to be sent to the LED driver.

In addition, dislocation compensation may be realized by any two devices of the timing controller, dimmer controller and LED driver. For example, the row may be compensated by the timing controller and the column may be compensated by the dimmer controller, thus improving the overall processing efficiency of the system.

In an implementation, there may be a plurality of LED drivers, and each LED driver is used to drive some of the mini-LEDs in the backlight unit; the compensating, by the LED driver, the duty ratio and/or the current value of mini-LEDs in each column according to the column compensation value includes:

acquiring, by each LED driver, rows and columns where mini-LEDs are located within a control range of this LED driver, and acquiring row compensation values corresponding to rows within the control range and column compensation values corresponding to columns within the control range; compensating the duty ratios and/or the current values of the mini-LEDs within the control range according to the row compensation values and the column compensation values within the control range of each LED driver.

In an implementation, there may be a plurality of LED drivers, and each LED driver may drive some of the mini-LEDs in the backlight unit. Specifically, each LED driver may control one or more rows of mini-LEDs, or control one or more columns of mini-LEDs, where the compensation values in the same row or column are the same.

Rows or columns where the mini-LEDs within a control range of a certain LED driver are located are determined, and row compensation values and column compensation values corresponding to the rows and the columns are acquired, and duty ratios and/or current values of the mini-LEDs within the control range are compensated according to the row compensation values or the column compensation values.

Exemplarily, when a control range of a certain LED driver is mini-LEDs in first to third rows in the backlight unit, row compensation values of mini-LEDs in each row of the first to third rows are acquired, and duty ratios and/or current values of the mini-LEDs in the first to third rows may be compensated respectively according to the row compensation values, without acquiring row compensation values of other rows.

By acquiring compensation values of mini-LEDs in a corresponding range through the LED driver to perform brightness compensation, it is possible to further reduce the data transmission amount of the LED driver, improve the control efficiency, and save the control time.

In a practical application, when the uniformity of the quality of the mini-LEDs is different, or the uniformity of the quality of the surface sticking process of the mini-LEDs is different, there may be mini-LEDs with display abnormality, and such display abnormality may be difficult to be alleviated by the compensation of row compensation values and column compensation values. Therefore, in the embodiments of the present disclosure, a single mini-LED with display abnormality may be further compensated.

In an implementation, the method further includes: determining an abnormality compensation value corresponding to a mini-LED with display abnormality; compensating, by a timing controller, backlight image data according to the abnormality compensation value to obtain compensated backlight image data to be sent to a dimmer controller.

The mini-LED with display abnormality may have too high brightness, too low brightness or other abnormal situation compared with other mini-LEDs. In an implementation, the mini-LED with display abnormality may be determined by a grayscale meter or human eyes, and an abnormality compensation value corresponding to the mini-LED with display abnormality may be determined. The backlight image data is compensated by a timing controller according to the abnormality compensation value, and then the compensated backlight image data may be sent to a dimmer controller.

In this embodiment, the mini-LED with display abnormality is compensated by the timing controller, which may quickly realize the compensation for the mini-LED.

In some implementations, by inserting a black frame between frames, the picture playing efficiency may be improved, the motion blur may be reduced, and the picture playing is smooth. However, there is a problem that the brightness of the screen becomes dark in proportion to the insertion time for inserting the black frame. Specifically, when the frequency of screen display is 1 second, and the frequency of data conversion for backlight control is also 1 second, when this black frame insertion function is added, assuming that a black frame of 0.5 second is inserted every 1 second, the compensation value may be reduced to ½ of the original one according to a ratio of the black frame insertion time to the total time, so as to solve such problem.

In an implementation, the mini-LED with display abnormality may be compensated by the dimmer controller or the LED driver.

Figure 10:
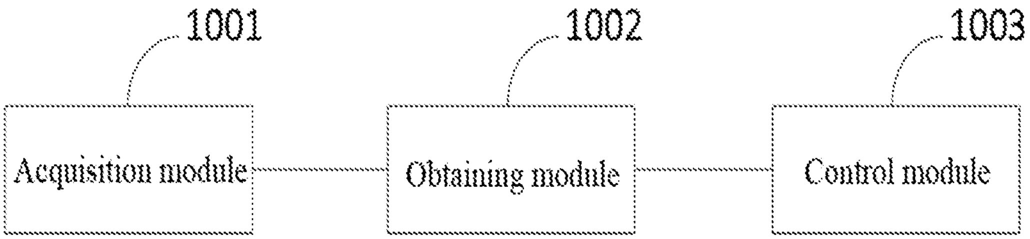
FIG. 10 is a schematic structural diagram of a backlight compensation apparatus provided in an embodiment of the present disclosure.

FIG. 10 is a structural schematic diagram of a backlight compensation apparatus provided in an embodiment of the present disclosure. As shown in FIG. 10, the apparatus includes:

an acquisition module 1001, configured to acquire a control signal for controlling brightness of a backlight unit, and acquire a row compensation value corresponding to mini-LEDs in each row and a column compensation value corresponding to mini-LEDs in each column;

an obtaining module 1002, configured to compensate the mini-LEDs in each row and the mini-LEDs in each column according to the row compensation value and the column compensation value to obtain a compensated control signal; and a control module 1003, configured to control the brightness of the backlight unit according to the compensated control signal.

In an implementation, the backlight unit is configured to provide a backlight function for a liquid crystal panel; and the acquisition module 1001 is further configured to:

determine a row compensation value corresponding to each row and a column compensation value corresponding to each column; and store the row compensation value corresponding to each row and the column compensation value corresponding to each column into a look-up-table;

correspondingly, the acquisition module 1001, when acquiring the control signal for controlling the brightness of the backlight unit, and acquiring the row compensation value corresponding to mini-LEDs in each row and the column compensation value corresponding to mini-LEDs in each column, is specifically configured to:

acquire a control signal matching with a display picture of the liquid crystal panel; and look up the row compensation value corresponding to the mini-LEDs in each row and the column compensation value corresponding to the mini-LEDs in each column from the look-up-table, or acquire the row compensation value and the column compensation value inputted by the user.

In an implementation, the acquisition module 1001, when determining the row compensation value corresponding to each row and the column compensation value corresponding to each column, is specifically configured to:

determine a first compensation value corresponding to each row according to positions of mini-LEDs in each row, where a first compensation value of a row located at an edge position is greater than a first compensation value of a row located in a middle position;

determine a second compensation value corresponding to each row according to distances between mini-LEDs in each row and a power supply, where the second compensation value is positively correlated with the distances;

for each row, adding the first compensation value to the second compensation value of the row to obtain the row compensation value corresponding to the row; and determine the column compensation value corresponding to each column according to positions of mini-LEDs in each column, where a column compensation value corresponding to a column located at an edge position is greater than a column compensation value corresponding to a column located in a middle position.

In an implementation, the acquisition module 1001, when determining the row compensation value corresponding to each row and the column compensation value corresponding to each column, is specifically configured to:

control each mini-LED based on the same control signal, and test an actual display brightness of each mini-LED through a grayscale meter or acquire an actual display brightness of each mini-LED inputted by the user;

select a mini-LED with lowest actual display brightness from a row farthest from the power supply, and calculate the row compensation value corresponding to each row according to the actual display brightness of the selected mini-LED and the actual display brightness of other mini-LEDs in a column where the selected mini-LED is located; and select a mini-LED with lowest actual display brightness from a column located at an edge position, and calculate the column compensation value corresponding to each column according to the actual display brightness of the selected mini-LED and the actual display brightness of other mini-LEDs in the row where the selected mini-LED is located.

In an implementation, the control signal includes the backlight image data sent by the timing controller to the dimmer controller, and also includes the duty ratio and/or the current value sent by the dimmer controller to the LED driver.

The obtaining module 1002 is specifically configured to:

compensate, by the dimmer controller, the backlight image data corresponding to mini-LEDs in each row according to the row compensation value to obtain the compensated backlight image data, and determine the duty ratio and/or the current value according to the compensated backlight image data and send the duty ratio and/or the current value to the LED driver; and compensate, by the LED driver, the duty ratio and/or the current value of mini-LEDs in each column according to the column compensation value, so as to generate a corresponding PWM signal according to the compensated duty ratio and/or the current value to control the corresponding brightness of each mini-LED.

In an implementation, there may be a plurality of LED drivers, and each LED driver is configured to drive some of the mini-LEDs in the backlight unit; the obtaining module 1002, when compensating, b the LED driver, the duty ratio and/or the current value of mini-LEDs in each column according to the column compensation value, is specifically configured to:

acquire, by each LED driver, rows and columns where mini-LEDs within a control range of the LED driver are located, and acquire row compensation values corresponding to the rows within the control range and column compensation values corresponding to the columns within the control range; and compensate the duty ratios and/or the current value of the mini-LEDs within the control range according to the row compensation values and the column compensation values within the control range of each LED driver.

In an implementation, the obtaining module 1002 is further configured to:

determine an abnormality compensation value corresponding to the mini-LED with display abnormality; and compensate the backlight image data by the timing controller according to the abnormality compensation value, to obtain compensated backlight image data, which are sent to the dimmer controller.

The specific implementation principle and beneficial effects of the backlight compensation device provided in this embodiment may be found in the above embodiments, and will not be described here.

Figure 11:
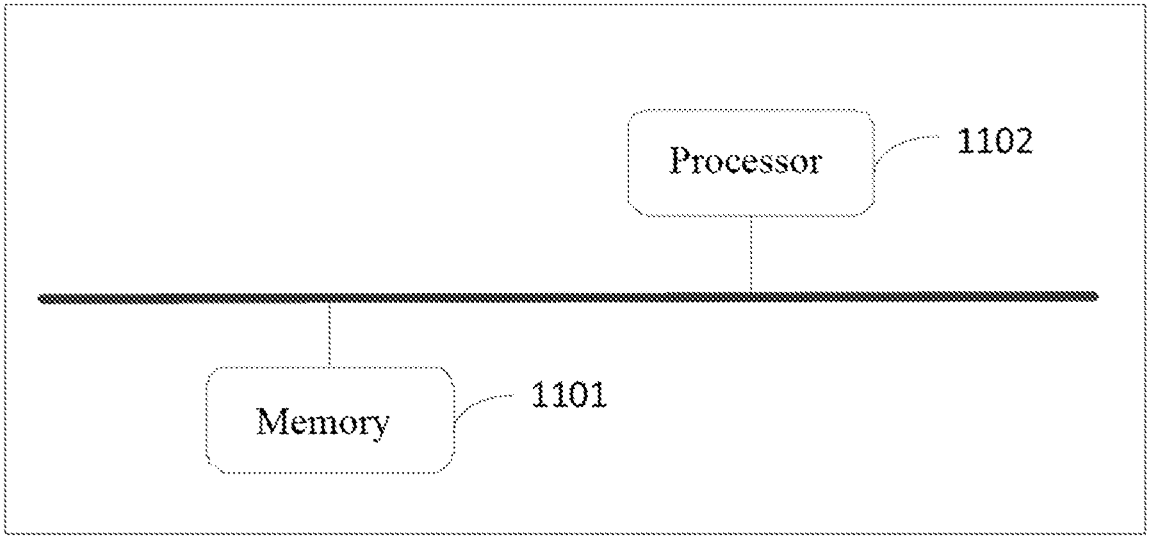
FIG. 11 is a schematic structural diagram of a backlight compensation device provided in an embodiment of the present disclosure.

FIG. 11 is a schematic structural diagram of a backlight compensation device provided in an embodiment of the present disclosure. As shown in FIG. 11, the backlight compensation device may include a memory 1102 and at least one processor 1101;

the memory 1102 stores computer-executable instructions;

the at least one processor 1101 executes the computer-executable instructions stored in the memory 1102, so that the at least one processor 1101 executes the method described in any one of the above embodiments.

The specific implementation principle and beneficial effects of the backlight compensation device provided in this embodiment may be found in the above embodiments, and will not be described here.

An embodiment of the present disclosure also provides a backlight compensation system, including the backlight compensation device shown in FIG. 11 and a backlight unit.

The specific implementation principle and beneficial effects of the backlight compensation system provided in this embodiment may be found in the above embodiments, and will not be described here.

An embodiment of the present disclosure also provides an electronic device, including the backlight compensation system described in any one of the above embodiments and a liquid crystal panel. The backlight compensation system is used to provide backlight for the liquid crystal panel.

In an implementation, the electronic device may be any device provided with an LED, such as a liquid crystal television, and it is not limited in the embodiments of the present disclosure.

The structure, function, connection relationship of components and the specific implementation principle, process and effect of the electronic device provided in this embodiment may be referred to the above embodiments, and will not be described here.

An embodiment of the present disclosure also provides a computer-readable storage medium, having computer-executable instructions stored therein, where the computer-executable instructions, when executed by a processor, are used to realize the method described in any one of the aforementioned embodiments.

An embodiment of the present disclosure also provide a computer program product, including a computer program, which, when executed by a processor, realizes the method described in any one of the foregoing embodiments.

In several embodiments provided in the present disclosure, it should be understood that the disclosed devices and methods may be realized in other ways. For example, the device embodiment described above is only illustrative. For example, the division of the modules is only a logical function division, and in actual implementation, there may be other division ways, for example, multiple modules may be combined or integrated into another system, or some features may be ignored or not executed. Additionally, the mutual coupling or communication connection shown or discussed may be coupling or communication connection through some interfaces, apparatuses or modules, and may also be electrical, mechanical or other forms.

The modules described as separate parts may or may not be physically separated, and the components displayed as modules may or may not be physical units, that is, they may be located in one place or distributed to multiple network units. Some or all of the modules may be selected according to actual needs to realize the solution of the embodiment in question.

In addition, the functional modules in the embodiments of the present disclosure may be integrated in one processing unit, or the modules may exist physically alone, or two or more modules may be integrated into one unit. The above modular units may be realized in a form of hardware, or in a form of hardware and software functional units.

The above integrated modules realized in a form of software functional module may be stored in a computer-readable storage medium. The above software functional module is stored in a storage medium and includes several instructions to cause a computer device (which may be a personal computer, a server, a network device and so on) or a processor to perform some of the steps of the methods according to various embodiments of the present disclosure.

It should be understood that the above processor may be a central processing unit (CPU), and may also be other general processor, a digital signal processor (DSP), an application specific integrated circuit (ASIC) and the like. The general processor may be a microprocessor or the processor may be any conventional processor and the like. The steps of the method disclosed in the present disclosure may be directly embodied as being performed by a hardware processor, or being performed by a combination of hardware and software modules in the processor.

The memory may include a high-speed read-only memory, and may also include a non-volatile memory (NVM), for example, at least one disk memory, and may also be a U disk, a mobile hard disk, a read-only memory, a magnetic disk or an optical disk, etc.

A bus may be an industry standard architecture (ISA) bus, a peripheral component interconnect (PCI) bus or an extended industry standard architecture (EISA) bus and the like. The bus may be divided into an address bus, a data bus and a control bus and the like. For convenience of representation, the bus in the drawings of the present disclosure is not limited to only one bus or one type of bus.

The above storage medium may be realized by any type of volatile or nonvolatile storage device or their combination, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk or an optical disk. The storage medium may be any available medium that may be accessed by a general-purpose or special-purpose computer.

An exemplary storage medium is coupled to a processor so that the processor is capable of reading information from and writing information to the storage medium. Of course, the storage medium may also be part of the processor. The processor and the storage medium may be located in an application specific integrated circuit (ASIC). Of course, the processor and the storage medium may also exist as separate components in an electronic device or master device.

It may be understood by those skilled in the art that all or some of steps for implementing the above method embodiments may be completed by hardware associated with program instructions. The aforementioned program may be stored in a computer-readable storage medium. When the program is executed, the steps included the above method embodiments are executed; and the aforementioned storage medium includes various media, such as a ROM, a random access memory (RAM), a magnetic disk or an optical disk, that may store program codes.

Other embodiments of the present disclosure will easily occur to those skilled in the art after considering the specification and practicing the invention disclosed herein. The present disclosure is intended to cover any variation, use or adaptation of the present disclosure, and these variations, uses or adaptations follow the general principles of the present disclosure and include common knowledge or conventional technical means, which are not disclosed in the present disclosure, in the art.

It should be understood that the present disclosure is not limited to the precise structures described above and shown in the drawings, and various modifications and changes may be made to them without departing from the scope of the present disclosure.

What is claimed is:

1. A backlight compensation method for compensating brightness of a plurality of mini-LEDs in a backlight unit, wherein the plurality of mini-LEDs comprise M rows and N columns, both M and N are positive integers greater than 1, and the backlight compensation method comprises:

acquiring a control signal for controlling the brightness of the backlight unit, and acquiring a row compensation value corresponding to mini-LEDs in each row and a column compensation value corresponding to mini-LEDs in each column;

compensating the mini-LEDs in each row and the mini-LEDs in each column according to the row compensation value and the column compensation value to obtain a compensated control signal; and controlling the brightness of the backlight unit according to the compensated control signal, wherein the control signal comprises backlight image data sent by a timing controller to a dimmer controller, and also comprises a duty ratio and/or a current value sent by the dimmer controller to an LED driver;

the compensating the mini-LEDs in each row and the mini-LEDs in each column according to the row compensation value and the column compensation value to obtain the compensated control signal comprises:

compensating, by the dimmer controller, the backlight image data corresponding to the mini-LEDs in each row according to the row compensation value to obtain compensated backlight image data, and determining the duty ratio and/or the current value according to the compensated backlight image data and sending the duty ratio and/or the current value to the LED driver; and compensating, by the LED driver, the duty ratio and/or the current value of the mini-LEDs in each column according to the column compensation value, so as to generate a corresponding PWM signal according to the compensated duty ratio and/or the compensated current value to control a corresponding brightness of each mini-LED.

2. The backlight compensation method according to claim 1, wherein there are a plurality of LED drivers, and each LED driver is configured to drive part of the mini-LEDs in the backlight unit; and the compensating, by the LED driver, the duty ratio and/or the current value of the mini-LEDs in each column according to the column compensation value comprises:

acquiring, by each LED driver, rows and columns where mini-LEDs within a control range of the LED driver are located, and acquiring the row compensation values corresponding to the rows within the control range and the column compensation values corresponding to the columns within the control range; and compensating the duty ratios and/or the current values of the mini-LEDs within the control range according to the row compensation values and the column compensation values within the control range of each LED driver.

3. The backlight compensation method according to claim 1, further comprising:

determining an abnormality compensation value corresponding to a mini-LED with display abnormality; and compensating, by the timing controller, the backlight image data according to the abnormality compensation value to obtain the compensated backlight image data, and sending the compensated backlight image data to the dimmer controller.

4. The backlight compensation method according to claim 1, wherein the backlight unit is configured to provide a backlight function for a liquid crystal panel; and the backlight compensation method further comprises:

determining the row compensation value corresponding to each row and the column compensation value corresponding to each column; and storing the row compensation value corresponding to each row and the column compensation value corresponding to each column into a look-up-table;

correspondingly, the acquiring the control signal for controlling the brightness of the backlight unit and acquiring the row compensation value corresponding to mini-LEDs in each row and the column compensation value corresponding to mini-LEDs in each column comprises:

acquiring a control signal matching with a display picture of the liquid crystal panel; and looking up the row compensation value corresponding to the mini-LEDs in each row and the column compensation value corresponding to the mini-LEDs in each column from the look-up-table, or acquiring the row compensation value and the column compensation value inputted by a user.

5. The backlight compensation method according to claim 4, wherein there are a plurality of LED drivers, and each LED driver is configured to drive part of the mini-LEDs in the backlight unit; and the compensating, by the LED driver, the duty ratio and/or the current value of the mini-LEDs in each column according to the column compensation value comprises:

acquiring, by each LED driver, rows and columns where mini-LEDs within a control range of the LED driver are located, and acquiring the row compensation values corresponding to the rows within the control range and the column compensation values corresponding to the columns within the control range; and compensating the duty ratios and/or the current values of the mini-LEDs within the control range according to the row compensation values and the column compensation values within the control range of each LED driver.

6. The backlight compensation method according to claim 4, further comprising:

determining an abnormality compensation value corresponding to a mini-LED with display abnormality; and compensating, by the timing controller, the backlight image data according to the abnormality compensation value to obtain the compensated backlight image data, and sending the compensated backlight image data to the dimmer controller.

7. The backlight compensation method according to claim 4, wherein the determining the row compensation value corresponding to each row and the column compensation value corresponding to each column comprises:

determining a first compensation value corresponding to each row according to positions of the mini-LEDs in each row, wherein the first compensation value of a row located at an edge position is greater than the first compensation value of a row located in a middle position;

determining a second compensation value corresponding to each row according to distances between the mini-LEDs in each row and a power supply, wherein the second compensation value is positively correlated with the distances;

for each row, adding the first compensation value to the second compensation value of the row to obtain the row compensation value corresponding to the row; and determining the column compensation value corresponding to each column according to positions of the mini-LEDs in each column, wherein the column compensation value corresponding to a column located at an edge position is greater than the column compensation value corresponding to a column located in a middle position.

8. The backlight compensation method according to claim 7, wherein there are a plurality of LED drivers, and each LED driver is configured to drive part of the mini-LEDs in the backlight unit; and the compensating, by the LED driver, the duty ratio and/or the current value of the mini-LEDs in each column according to the column compensation value comprises:

acquiring, by each LED driver, rows and columns where mini-LEDs within a control range of the LED driver are located, and acquiring the row compensation values corresponding to the rows within the control range and the column compensation values corresponding to the columns within the control range; and compensating the duty ratios and/or the current values of the mini-LEDs within the control range according to the row compensation values and the column compensation values within the control range of each LED driver.

9. The backlight compensation method according to claim 7, further comprising:

determining an abnormality compensation value corresponding to a mini-LED with display abnormality; and compensating, by the timing controller, the backlight image data according to the abnormality compensation value to obtain the compensated backlight image data, and sending the compensated backlight image data to the dimmer controller.

10. The backlight compensation method according to claim 4, wherein the determining the row compensation value corresponding to each row and the column compensation value corresponding to each column comprises:

controlling each mini-LED based on a same control signal, and testing an actual display brightness of each mini-LED by a grayscale meter or acquiring an actual display brightness of each mini-LED inputted by a user;

selecting a mini-LED with a lowest actual display brightness from a row farthest from a power supply, and calculating the row compensation value corresponding to each row according to the actual display brightness of the selected mini-LED and the actual display brightness of other mini-LEDs in a column where the selected mini-LED is located; and selecting a mini-LED with a lowest actual display brightness from a column located at an edge position, and calculating the column compensation value corresponding to each column according to the actual display brightness of the selected mini-LED and the actual display brightness of other mini-LEDs in a row where the selected mini-LED is located.

11. The backlight compensation method according to claim 10, wherein there are a plurality of LED drivers, and each LED driver is configured to drive part of the mini-LEDs in the backlight unit; and the compensating, by the LED driver, the duty ratio and/or the current value of the mini-LEDs in each column according to the column compensation value comprises:

acquiring, by each LED driver, rows and columns where mini-LEDs within a control range of the LED driver are located, and acquiring the row compensation values corresponding to the rows within the control range and the column compensation values corresponding to the columns within the control range; and compensating the duty ratios and/or the current values of the mini-LEDs within the control range according to the row compensation values and the column compensation values within the control range of each LED driver.

12. The backlight compensation method according to claim 10, further comprising:

determining an abnormality compensation value corresponding to a mini-LED with display abnormality; and compensating, by the timing controller, the backlight image data according to the abnormality compensation value to obtain the compensated backlight image data, and sending the compensated backlight image data to the dimmer controller.

13. A non-transitory computer-readable storage medium, wherein computer-executable instructions are stored in the non-transitory computer-readable storage medium, and the computer-executable instructions, when executed by a processor, are used to implement the backlight compensation method according to claim 1.

14. A backlight compensation device, comprising: a memory and at least one processor;

the memory stores computer-executable instructions; and the at least one processor executes the computer-executable instructions stored in the memory to cause the at least one processor to execute operations for compensating brightness of a plurality of mini-LEDs in a backlight unit, wherein the plurality of mini-LEDs comprise M rows and N columns, both M and N are positive integers greater than 1, and the operations comprise:

acquiring a control signal for controlling the brightness of the backlight unit, and acquiring a row compensation value corresponding to mini-LEDs in each row and a column compensation value corresponding to mini-LEDs in each column;

compensating the mini-LEDs in each row and the mini-LEDs in each column according to the row compensation value and the column compensation value to obtain a compensated control signal; and controlling the brightness of the backlight unit according to the compensated control signal, wherein the control signal comprises backlight image data sent by a timing controller to a dimmer controller, and also comprises a duty ratio and/or a current value sent by the dimmer controller to an LED driver;

the compensating the mini-LEDs in each row and the mini-LEDs in each column according to the row compensation value and the column compensation value to obtain the compensated control signal comprises:

compensating, by the dimmer controller, the backlight image data corresponding to the mini-LEDs in each row according to the row compensation value to obtain compensated backlight image data, and determining the duty ratio and/or the current value according to the compensated backlight image data and sending the duty ratio and/or the current value to the LED driver; and compensating, by the LED driver, the duty ratio and/or the current value of the mini-LEDs in each column according to the column compensation value, so as to generate a corresponding PWM signal according to the compensated duty ratio and/or the compensated current value to control a corresponding brightness of each mini-LED.

15. The backlight compensation device according to claim 14, wherein the backlight unit is configured to provide a backlight function for a liquid crystal panel; the at least one processor further executes the following operations:

determining the row compensation value corresponding to each row and the column compensation value corresponding to each column; and storing the row compensation value corresponding to each row and the column compensation value corresponding to each column into a look-up-table;

correspondingly, the acquiring the control signal for controlling the brightness of the backlight unit and acquiring the row compensation value corresponding to mini-LEDs in each row and the column compensation value corresponding to mini-LEDs in each column comprises:

acquiring a control signal matching with a display picture of the liquid crystal panel; and looking up the row compensation value corresponding to the mini-LEDs in each row and the column compensation value corresponding to the mini-LEDs in each column from the look-up-table, or acquiring the row compensation value and the column compensation value inputted by a user.

16. A backlight compensation system, comprising the backlight compensation device according to claim 14 and the backlight unit.

* * * * *